(12) United States Patent
Kawaguchi

(10) Patent No.: US 6,873,835 B2
(45) Date of Patent: Mar. 29, 2005

(54) ANTENNA SELECTION CIRCUIT FOR USE IN MOBILE COMPUTERS

(75) Inventor: Dean Kawaguchi, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 412 days.

(21) Appl. No.: 10/038,243

(22) Filed: Jan. 3, 2002

(65) Prior Publication Data

US 2003/0050033 A1 Mar. 13, 2003

Related U.S. Application Data

(60) Provisional application No. 60/318,966, filed on Sep. 13, 2001.

(51) Int. Cl.$^7$ ............................. H04B 1/06; H04B 1/44
(52) U.S. Cl. ............................. 455/277.1; 455/277.2; 455/78; 455/133; 455/134; 455/575.7
(58) Field of Search ......................... 455/277.1, 277.2, 455/278.1, 280, 78, 83, 88, 101, 132–135, 575.7

(56) References Cited

U.S. PATENT DOCUMENTS

| | | | | |
|---|---|---|---|---|
| 5,715,525 A | * | 2/1998 | Tarusawa et al. | 455/101 |
| 6,032,033 A | * | 2/2000 | Morris et al. | 455/277.2 |
| 6,055,422 A | * | 4/2000 | Saitoh | 455/277.1 |
| 2002/0004375 A1 | * | 1/2002 | Spencer et al. | 455/277.1 |

* cited by examiner

*Primary Examiner*—Duc M. Nguyen
(74) *Attorney, Agent, or Firm*—Kirschstein, et al.

(57) ABSTRACT

A method of selecting between first and second antennas in a quadrature amplitude modulation receiver having in-phase (I) and quadrature (Q) signal channels for demodulating signals received by the antennas, comprising the steps of imultaneously connecting the first antenna to the I channel to obtain a first output signal having a first amplitude, and the second antenna to the Q channel to obtain a second output signal having a second amplitude; measuring the first and second amplitude to obtain a greater amplitude for one on the antennas; and switching to said of the antennas having the greater amplitude for demodulating the received signals.

6 Claims, 3 Drawing Sheets

ANTENNA SELECTION CIRCUIT FOR USE IN MOBILE COMPUTERS

REFERENCE TO RELATED APPLICATIONS

This application claims the benefit of U.S. Provisional Patent Application Ser. No. 60/318,966 filed Sep. 13, 2001.

BACKGROUND OF THE INVENTION

1. Field of the Invention

The present invention relates to dual antenna mobile computers such as RF computer terminals connected to wireless networks, and more particularly to receivers using I and Q channel demodulators in such computers.

2. Background of the Invention

Wireless local area networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local area network, including, optionally, one or more servers or host computer systems.

One increasingly important type of mobile computer are those which are coupled to or incorporates a bar code symbol reader, and are now in very common use for portable data collection applications. Typically, a bar code symbol comprises one or more rows of light and dark regions, typically in the form of rectangle. The relative widths of the dark regions, the bars and/or the widths of the light regions, the spaces, encode data or information in the symbol. A bar code symbol reader illuminates the symbol and senses light reflected from the regions of differing light reflectivity to detect the relative widths and spacings of the regions and derive the encoded information. Bar code reading data collection application software, executing on such mobile computers, improve the efficiency and accuracy of data input for a wide variety of applications. The ease of data input in such systems facilitates more frequent and detailed data input, for example, to provide efficient taking of inventories, tracking of work in progress, and make use of applications programs that may communicate to and interoperate with other applications programs operating on a remote host or server which the mobile computer communicates with through a wireless network.

Wireless and radio frequency (RF) protocols are known which support the logical interconnection of mobile computers and roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the communications between a given terminal and the network through the selected access point. One such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 a Standard").

The IEEE 802.11 a Standard also specifies the PHY layer operating in the 5 GHz band, which is open to unlicensed devices in the U.S. The IEEE 802.11 a Standard is based on orthogonal frequency division multiplexing (OFDM) to modulate the data. Digital data is divided among a large number of adjacent carriers so that a relatively small amount of data is carried on each carrier. Adjacent carriers are mathematically orthogonal. Their sidebands may overlap but signals can be received without adjacent carrier interference. The main benefit of OFDM modulation is it robustness to multipath echoes, which are encountered in the indoor and mobile environments. Each OFDM symbol is composed of fifty-two non-zero subcarriers of which forty-eight are data subcarriers and the remaining four are carrier pilot subcarriers. The PHY specifications encompass data rates from 6 Mbit/s up to 54 Mbit/s with 20 MHZ spacing between adjacent channels. All implementations are required to support 6, 12 and 24 Mbit/s. Optional extensions are for 9, 18, 36, 48 and 54 Mbit/s. The range of data rates is provided to match the wide range of radio channel characteristics in both indoor and outdoor environments. The multirate mechanism of the MAC protocol ensures that all devices communicate with each other at the best data rate in the present channel.

In a conventional single-carrier digital communication system, data symbols are transmitted serially using some modulation scheme, and the spectrum of each symbol is allowed to occupy the entire channel bandwidth. In multi-carrier modulation schemes, data symbols are transmitted in parallel on multiple subcarriers that share the channel bandwidth using some form of frequency-division multiplexing (FDM). The modulation scheme on one subcarrier may be chosen independent of that used on other subcarriers. Thus, subcarriers in frequently segments of the channel with a high signal-to-noise ratio (SNR) may use high-rate modulation, while those with degraded SNR use low-rate modulation, or are not modulated. Systems which adaptively load the subcarriers differently depending on the spectral shaping of the channel are common in wired applications such as asymmetric digital subscriber lines (ADSL), and the technique is usually referred to as discrete multitone or DMT. DMT systems have been widely analyzed and reported in the prior art.

In OFDM the spectra of the subcarriers overlap, and their spacing is chosen so that each subcarrier is orthogonal to all other subcarriers. The common method of obtaining orthogonality of subcarriers is to choose their frequency spacing equal to the inverse of the subcarrier symbol duration. Baseband processing of the OFDM signal is then conveniently effected using the discrete Fourier transform, implemented as an inverse fast Fourier transform (IFET) and a fast Fourier transform (FFT) that modulate and demodulate parallel data blocks, respectively. The set of subcarriers generated during one transform defines an OFDM symbol. The subcarriers are conveyed by serial transmission over the channel of the time samples generated by the IFFT. The duration of the OFDM symbol, which is the same as that of the subcarrier symbol, is thus equal to the time window of the transform.

Prior to the present invention, there has not been a simple, automatic technique and circuit would allow mobile computer to select one out of two antennas to maximize reception of the signal.

SUMMARY OF THE INVENTION

1. Objects of the Invention

It is a general object of the present invention to provide an improved transceiver antenna selection circuit.

It is another object of the invention to provide a mobile computer capable of quickly selecting one of two antennas for reception of weak signals.

Additional objects, advantages and novel features of the present invention will become apparent to those skilled in the art form this disclosure, including the following detail description, as well as by practice of the invention. While the invention is described below with reference to preferred embodiments, it should be understood that the invention is not limited thereto. Those of ordinary skill in the art having access to the teaching herein will recognize additional applications, modifications and embodiments in other fields, which are within the scope of the invention as disclosed and claimed herein and with respect to which the invention could be of significant utility.

2. Summary of the Invention

The present invention provides a method of selecting between first and second antennas in a quadrature amplitude modulation receiver having in-phase (I) and quadrature (Q) signal channels for demodulating signals received by the antennas, by simultaneously connecting the first antenna to the I channel to obtain a first output signal, the second antenna to the Q channel to obtain a second output signal, measuring the first and second amplitudes of the respective output signals to obtain the greater amplitudes for one of the antennas; and switching to the antenna having the greater signal amplitude for utilizing such antenna for receiving the signal.

The novel features and characteristics of the invention are set forth in the appended claims. The invention itself, however, as ell as other features and advantages thereof, will be vest understood by reference to a detailed description of a specific embodiment, when read in conjunction with the accompanying drawings.

DESCRIPTION OF THE PREFERRED EMBODIMENT

The present invention is concerned with a circuit for a mobile computer, which incorporates two antennas for the purpose of antenna diversity. More particularly, the invention is concerned with a antenna switching circuit which is designed in order to minimize the number of components the circuit being utilized in selecting which antenna to use a particular location based upon an analysis of the signal strength on each of the antennas. As is well known in the field of radio transceivers, a radio signal of quadrature modulation is analyzed in two out of phase portions known as the I and Q channels. Separate circuits exist in prior art transceivers for processing the radio frequency signal in the I and Q channel respectively. The present invention assumes that the modulation technique is one in which the time integrated signal power over a predetermined time interval in both I and Q channel are the same.

Figure 1:
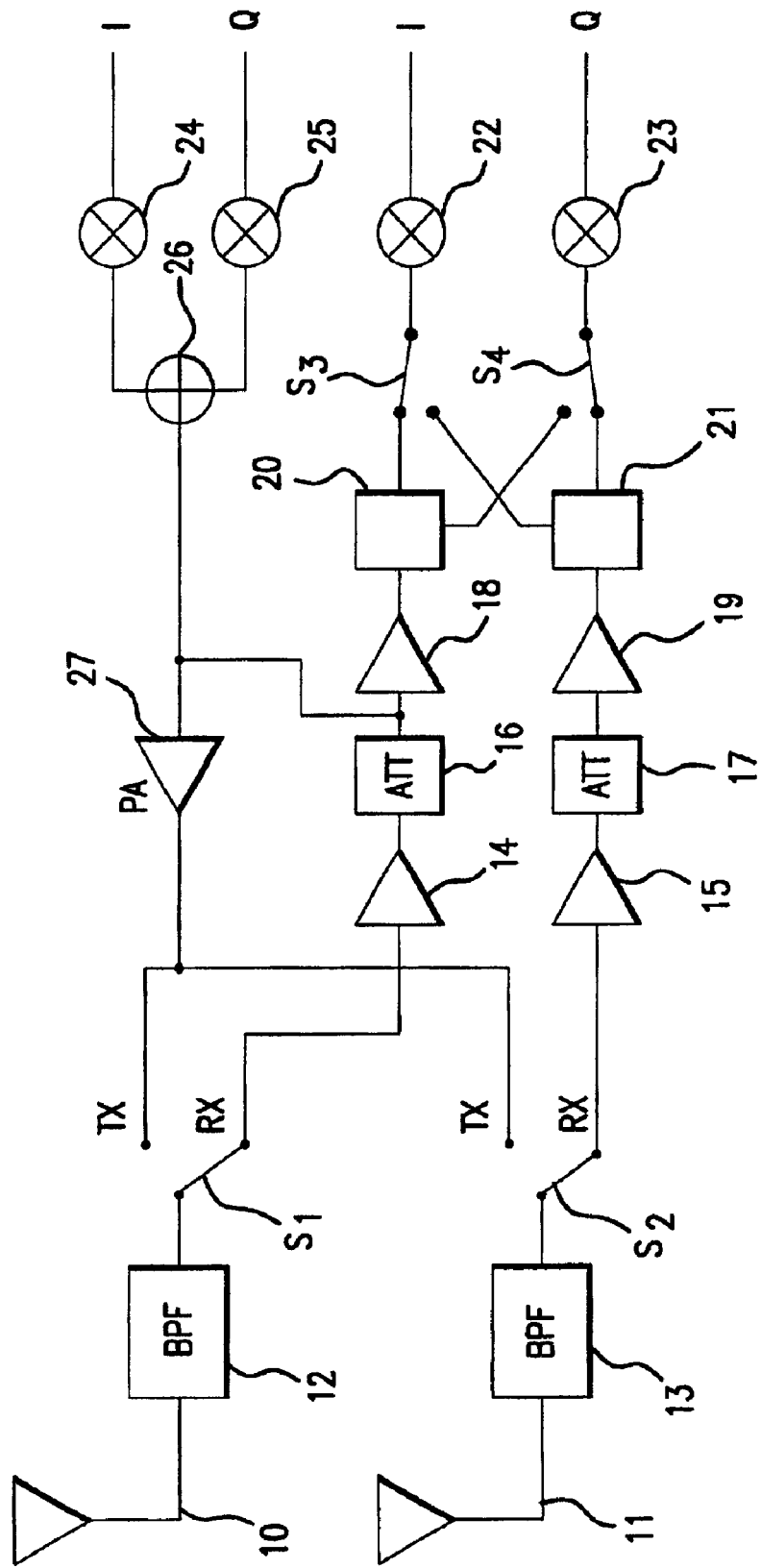
FIG. 1 shows the schematic diagram of a circuit according to the present invention with the switches in the circuit set to a test position.

The present invention operates during the signal acquisition phase of the communication operation in order for the transceiver to decide which of the two antennas to utilize. More particularly FIG. 1, shows a first antenna 10 connected to a band pass filter 12 which is in turn directly connected to a switch S1. The switch has two pole positions corresponding to transmit (TX) and receive (RX). FIG. 1 represents the testing or antenna evaluation mode of operating the circuit according to the present invention in which the switch S1 is set to RX, and the corresponding switch S2 which is connected to the second antenna 11 through band pass filter 13 is also connected to its RX pole.

The output of the switch of S1 at the receive position is connected to the I channel, beginning with amplifier 14 which is in turn directly connected to the attenuator ATT component 16 to provide matching and automatic gain control. The ATT component 16 is directly connected to another amplifier 18 whose output is connected to coupler unit 20. The first output of coupler unit 20 is connected to one terminal of a double pole of switch S3, and another second output is connected to a corresponding one terminal of a double pole of switch S4. In the present FIG. 1 configuration, the switch S3 is directly connected to the output coupling 20, while the switch S4 is disconnected from output coupling 20. The effect is that in the position of the switch shown in FIG. 1, the output of coupler 20 is directly connected to the multiplier 22 whose output is connected to an I channel terminal, whereby a signal strength measurement from antenna 10 may be made.

Turning to the Q channel, the output of the switch of S2 at the receive position is connected to the amplifier 15 which is in turn directly connected to the ATT component 17. The ATT component 17 is directly connected to another amplifier 19 whose output is connected to coupler unit 21. The output of coupler unit 21 is connected to a second terminal for the double pole switch S3, and another output is connected to one terminal of a double pole of switch S4. In the present FIG. 1 configuration, the pole of switch S4 is directly connected to the output coupling 21, while the pole of switch S3 is disconnected form coupling 21. The effect is that in the position is the switch S4 shown in FIG. 1, the output of coupler 21 is directly connected to the multiplier 23 whose output is connected to an Q channel terminal, whereby a signal strength measurement from antenna 11 may be made.

Figure 2:
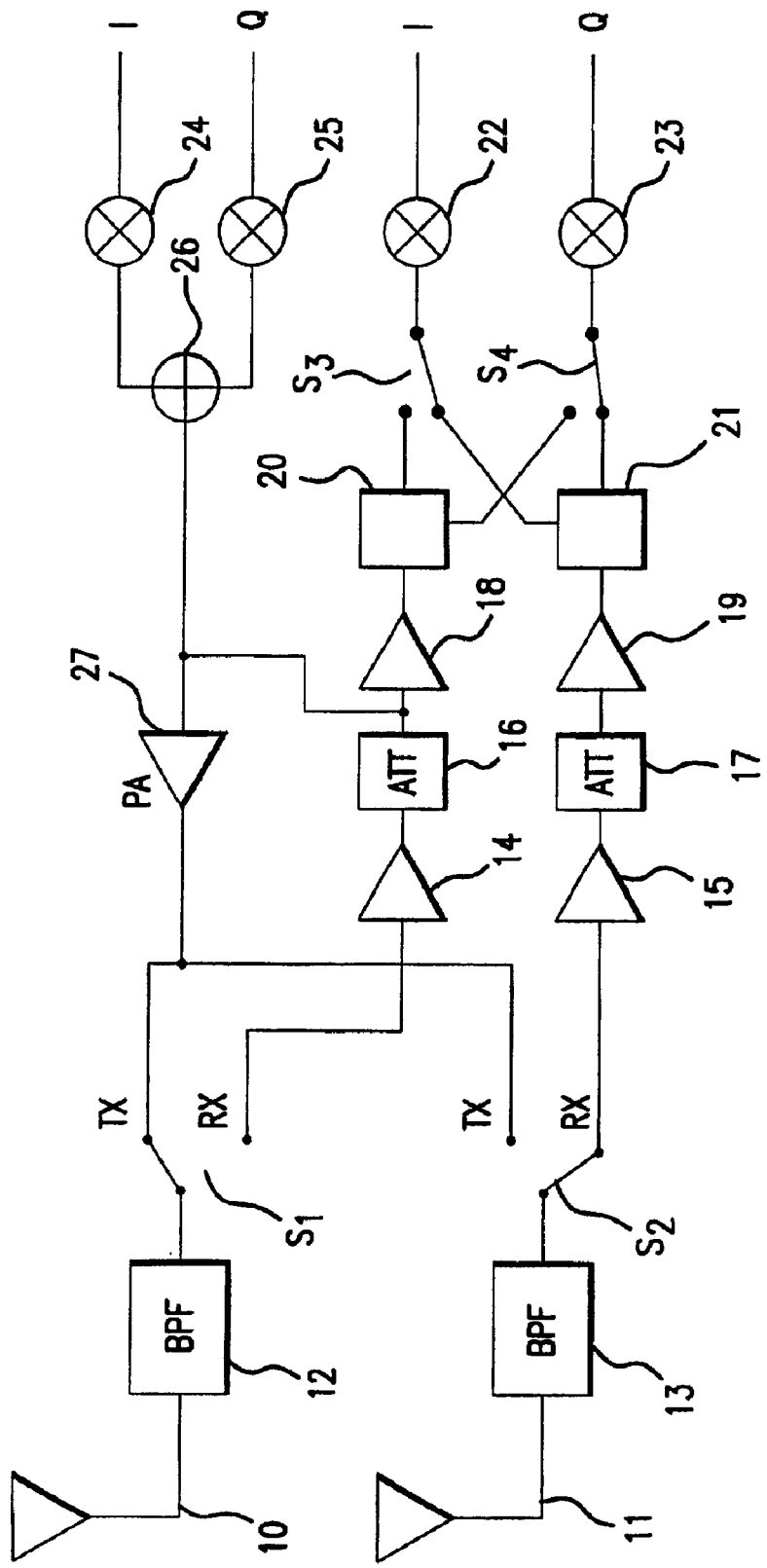
FIG. 2 shows a schematic diagram of the circuit of FIG. 1 using a first antenna as the receiver antenna.

Turing to FIG. 2, there is illustrated the configuration of the same circuit in which antenna 11 is selected as the receive antenna. Switch S1 is connected to the TX position, and S2 connected the RX position. Switch S3 and S4 are connected to their lower poles respectively.

On the transmit side of the circuit, antenna 10 is connected to the band pass filter 12, which is in turn connected to switch S1 connected to the TX pole. The TX pole of switches S1 is connected to power amplifier (PA) 27, which is in turn connected to summer element 26, whose inputs are connected to multiplier 24 and 25 respectively associated with I and Q channels.

Figure 3:
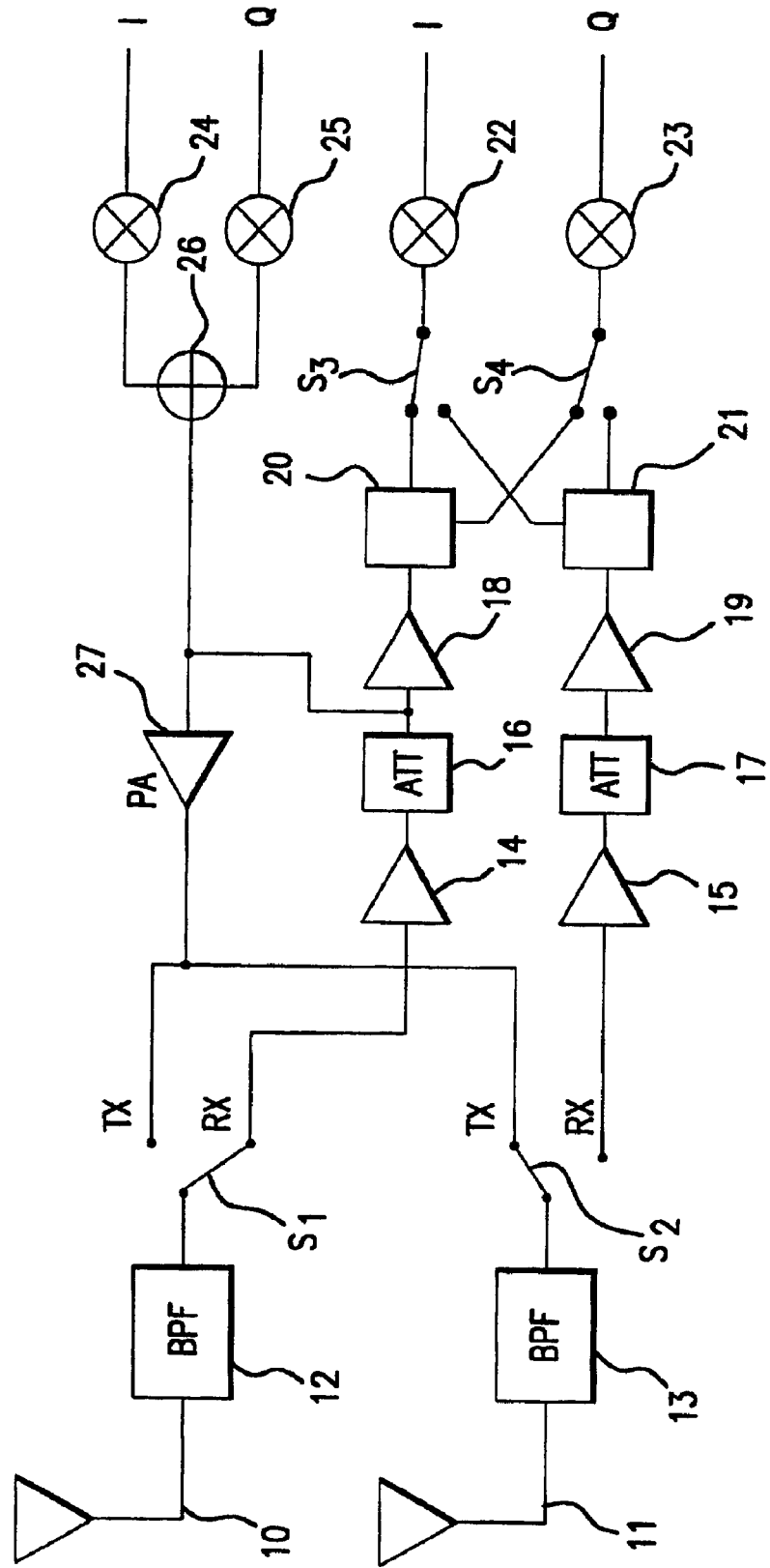
FIG. 3 shows a schematic diagram of the circuit of FIG. 1 using a second antenna as the receiver antenna.

Turning to FIG. 3, there is illustrated the configuration of the same circuit in which antenna 10 is selected as the receive antenna. Switch S1 is connected to the RX position, and S2 is connected to the TX position. Switch S3 is connected to its upper pole, and S4 is connected to its upper pole.

On the transmit side of the circuit, antenna 11 is connected to the band pass filter 13, which is in turn connected to switch S2 connected to the TX pole. The TX pole of switches S2 are connected to power amplifier (PA) 27, which is in turn connected to summer element 26, whose inputs are connected to multiplier 24 and 25 respectively associated with I and Q channels.

Various aspects of the techniques and apparatus may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or website which may be downloaded to the computer product automatically or on demand. The foregoing techniques may be performed, for example, single central processor, a multiprocessor, one or more digital signal processors, gate arrays of logic gates, or hardwired to logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in a circuit for use in a transceiver mobile unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A dual antenna arrangement for transmitting and receiving data in a quadrature amplitude modulation transceiver having in -phase (I) and quadrature (Q) transmit and receive channels, comprising:

a) a pair of radio frequency antennas; and
   b) a switching circuit for operatively switching the antennas to the I and Q channels between
      i) an antenna evaluation mode in which both antennas are simultaneously connected to the I and Q receive channels for selection of one of the antennas having a greater received signal strength, and
      ii) an operating mode in which the selected one of the antennas is connected to the I and Q receive channels for receiving the data, and in which the other of the antennas is simultaneously connected to the I and Q transmit channels for transmitting the data.

2. The arrangement of claim 1, and a power amplifier between the I and Q transmit channels and the other of the antennas.

3. The arrangement of claim 1, wherein the antennas are incorporated in a portable data collection terminal.

4. A method of transmitting and receiving data in a quadrature amplitude modulation transceiver having in -phase (I) and quadrature (Q) transmit and receive channels, comprising the steps of:

a) providing a pair of radio frequency antennas; and
   b) operatively switching the antennas to the I and Q channels between
      i) an antenna evaluation mode in which both antennas are simultaneously connected to the I and Q receive channels for selection of one of the antennas having a greater received signal strength, and
      ii) an operating mode in which the selected one of the antennas is connected to the I and Q receive channels for receiving the data, and in which the other of the antennas is simultaneously connected to the I and Q transmit channels for transmitting. the data.

5. The method of claim 4, and connecting a power amplifier between the I and Q transmit channels and the other of the antennas.

6. The method of claim 4, and incorporating the antennas in a portable data collection terminal.

* * * * *